US012808461B2

(12) United States Patent
Golshadi et al.

(10) Patent No.: US 12,808,461 B2
(45) Date of Patent: Nov. 24, 2026

(54) ROTATING CONNECTOR FOR MECHANICALLY ATTACHING A DEVICE TO A SUPPORT STRUCTURE VIA AN ATTACHMENT STUD, AND CONNECTING SYSTEM, ATTACHING ARRANGEMENT AND METHOD WITH SUCH CONNECTOR

(71) Applicant: Volvo Truck Corporation, Gothenburg (SE)

(72) Inventors: Zohreh Golshadi, Partille (SE); Kim Hasse, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/256,626

(22) Filed: Jul. 1, 2025

(65) Prior Publication Data

US 2026/0036224 A1 Feb. 5, 2026

(30) Foreign Application Priority Data

Jul. 31, 2024 (EP) .................................... 24191981

(51) Int. Cl.
*F16L 3/06* (2006.01)
*B60R 16/02* (2006.01)
(Continued)

(52) U.S. Cl.
CPC ................ *F16L 3/06* (2013.01); *B60R 16/02* (2013.01); *B62D 65/02* (2013.01); *H02G 3/30* (2013.01)

(58) Field of Classification Search
CPC ........... F16L 3/06; B60R 16/02; B62D 65/02; H02G 3/30; F16B 21/02; F16M 13/02
(Continued)

(56) References Cited

U.S. PATENT DOCUMENTS 4,527,760 A * 7/1985 Salacuse ................. F16B 21/02 248/108
6,669,263 B2 * 12/2003 Asai ........................ F16B 21/02 29/434
(Continued)

FOREIGN PATENT DOCUMENTS

EP 0503760 A1 9/1992
EP 2358564 B1 9/2012
WO 2021032421 A1 2/2021

OTHER PUBLICATIONS

Extended European Search Report for European Patent Application No. 24191981.0, mailed Jan. 20, 2025, 10 pages.

*Primary Examiner* — Sarang Afzali
*Assistant Examiner* — Darrell C Ford
(74) *Attorney, Agent, or Firm* — Withrow & Terranova, PLLC

(57) ABSTRACT

A rotating connector, a connecting system, and an attaching arrangement, for mechanically attaching a device to a support structure via an attachment stud, wherein the rotating connector comprises a first interface portion for a rotating tool-free mechanical clip-on connection to the attachment stud and a second interface portion for a tool-free mechanical connection to the device, wherein the first interface portion is a rotary hub interface having a main axis and wherein the second interface portion is a tool-free mechanical clip-on connection to the device. The invention also relates to a method for mechanically attaching a component to a support structure of a vehicle with such an attaching arrangement.

14 Claims, 4 Drawing Sheets

(51) Int. Cl.
*B62D 65/02* (2006.01)
*H02G 3/30* (2006.01)

(58) Field of Classification Search
USPC .................................... 411/349; 248/68.1, 70
See application file for complete search history.

(56) References Cited

U.S. PATENT DOCUMENTS

| | | | | |
|---|---|---|---|---|
| 11,466,716 | B2 * | 10/2022 | Milekovic | B25B 27/023 |
| 2007/0240395 | A9 * | 10/2007 | Kentner | F16B 21/02<br>248/222.52 |
| 2016/0108950 | A1 | 4/2016 | Steffenfauseweh et al. | |
| 2016/0265566 | A1 | 9/2016 | Talley et al. | |
| 2017/0057420 | A1 * | 3/2017 | Fiedler | F16M 11/16 |
| 2018/0177660 | A1 * | 6/2018 | Davies | F16B 2/08 |
| 2018/0363689 | A1 * | 12/2018 | Richter | A61F 2/78 |
| 2019/0222724 | A1 * | 7/2019 | Vestergren | F16M 13/02 |
| 2022/0307529 | A1 | 9/2022 | Basavaraj Hamasagar | |

* cited by examiner

Fig. 1
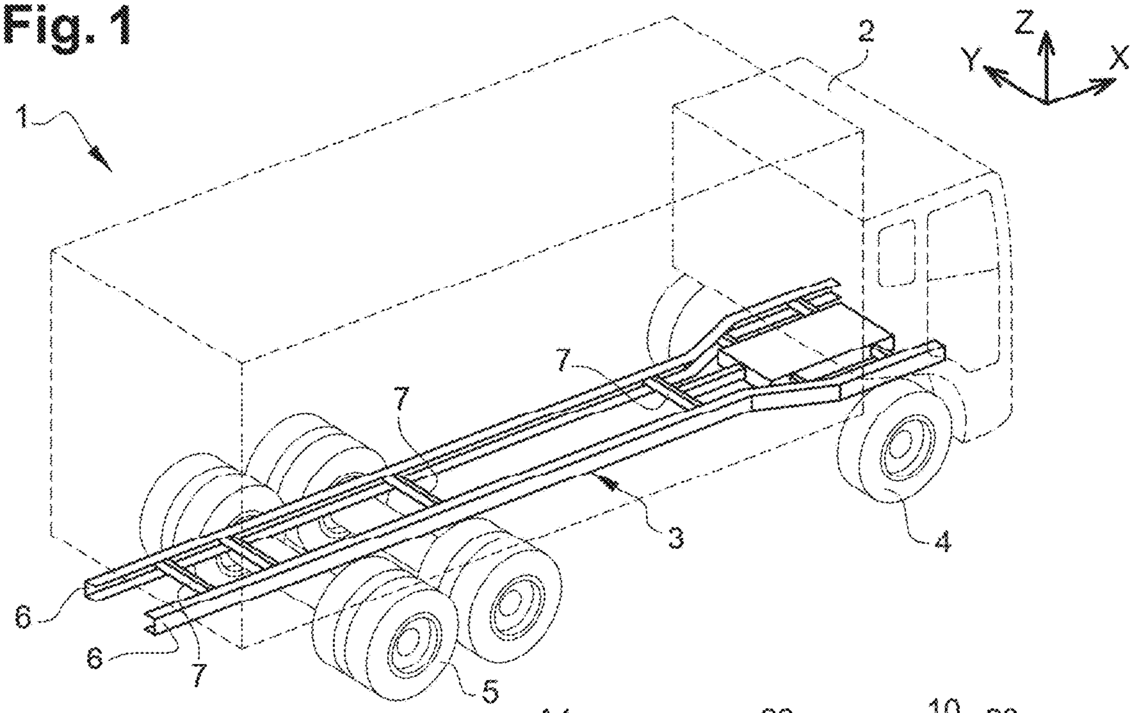
Fig. 2
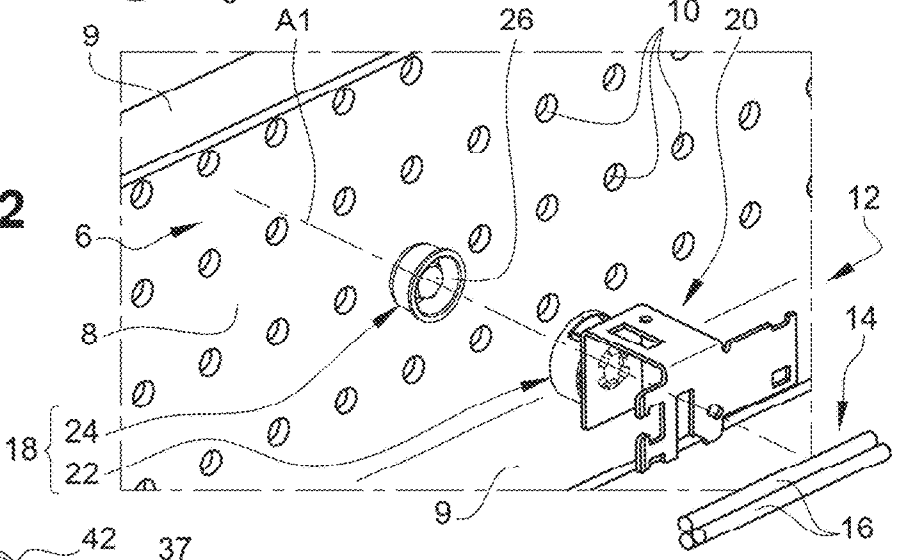
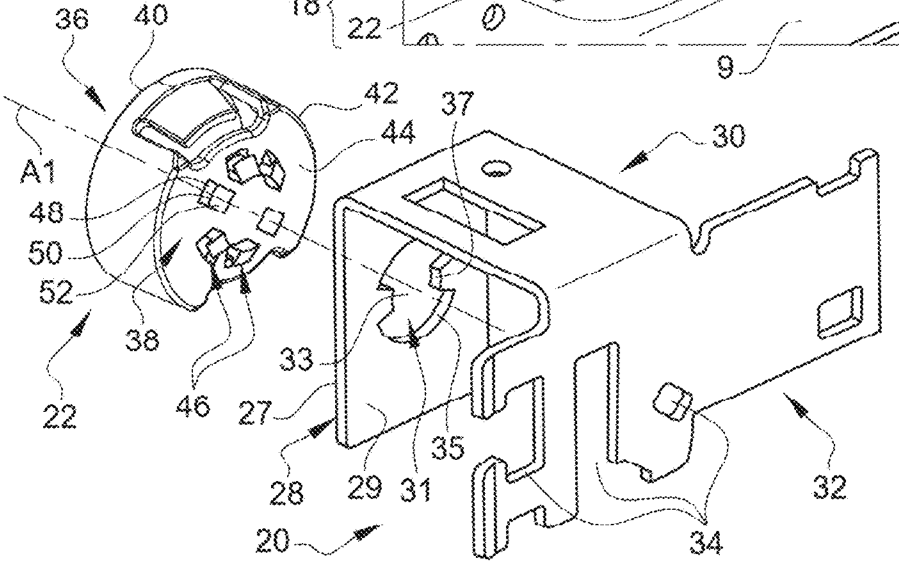
Fig. 3

ROTATING CONNECTOR FOR MECHANICALLY ATTACHING A DEVICE TO A SUPPORT STRUCTURE VIA AN ATTACHMENT STUD, AND CONNECTING SYSTEM, ATTACHING ARRANGEMENT AND METHOD WITH SUCH CONNECTOR

PRIORITY APPLICATIONS

The present application claims priority to European Patent Application No. 24191981.0, filed on Jul. 31, 2024, and entitled "ROTATING CONNECTOR FOR MECHANICALLY ATTACHING A DEVICE TO A SUPPORT STRUCTURE VIA AN ATTACHMENT STUD, AND CONNECTING SYSTEM, ATTACHING ARRANGEMENT AND METHOD WITH SUCH CONNECTOR," which is incorporated herein by reference in its entirety.

TECHNICAL FIELD

The disclosure relates generally to a rotating connector for mechanically attaching a device to a support structure via an attachment stud, which may for example be used in an attaching arrangement for attaching a component to support structure, the support structure being for example a part of an automotive vehicle, and the component being for example one of an electrical wire or bundle of wires or hydraulic or pneumatic pipes or bundles of pipes. In particular aspects, the disclosure relates to a connecting system comprising such a rotating connector and an attachment stud for securing the rotating connector system to the support structure. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Rotating connectors for mechanically attaching a device to a support structure exist in a variety of designs. The design of a rotating connector in particular, and more generally of the connecting system and attaching arrangement, needs to be adapted to allow mechanical attachment of the device to the support structure, taking into account the environment in which such attachment will be performed.

Vehicles in general comprise various types of elongated conductors which conduct electricity, pressurized hydraulic fluid or compressed air from one location to another location on the vehicle, from one element to another element in an electrical, hydraulic or pneumatic system or network. These conductors may be grouped in bundles, at any location on the vehicle, and may be attached, individually or together as a bundle, on a support structure of the vehicle at that location. Typically, the support structure can be an element of the bodywork of the vehicle, and/or a frame member of the chassis of the vehicle. Typically, the elongated conductors may be flexible rather than rigid. Typically, the elongated conductors of an electrical, hydraulic or pneumatic system or network of the vehicle may be pre-assembled into a so-called harness, before such harness is assembled to the vehicle on a vehicle assembly line. Such constitution of a harness comprising one or several bundles of elongated conductors is favorable for the assembly of the vehicle, but due to the size, the weight, and the relative flexibility of the harness, its attachment to the vehicle may be complex and should be simplified. For example, any attaching arrangement for attaching such elongated conductors should preferably allow for reducing the use of tools in the most critical steps of the attachment process.

SUMMARY

According to a first aspect of the disclosure, it is disclosed a rotating connector for mechanically attaching a device to a support structure via an attachment stud. The rotating connector comprises a first interface portion for a rotating tool-free mechanical clip-on connection to the attachment stud and a second interface portion for a mechanical connection to the device. The first interface portion is a rotary hub interface having a main axis and extending axially along its main axis, in a first axial direction, to a first axial extremity and, in a second axial direction opposite to the first axial direction, to a second axial extremity. The second interface portion is located at the second axial extremity of the rotary hub interface, and the second interface portion is a tool-free mechanical clip-on connection to the device. The first aspect of the disclosure may seek to allow for an easy to implement connection of the device to the support structure. A technical benefit may include faster, cheaper and/or more ergonomic assembly method.

Optionally in some examples, including in at least one preferred example, the second interface portion may comprise an axial abutment surface turned outwards in the second axial direction, and the second interface portion may comprise at least one hook portion which extends axially in the second axial direction with respect to the axial abutment surface for hooking onto the device. A technical benefit may include achieving a second interface portion which provides for an easy connection to the device, at a low cost.

Optionally in some examples, including in at least one preferred example, the at least one hook portion may comprise a stem portion which extends in the second axial direction away from the axial abutment surface and comprises, at a free end of the stem portion, a hooking surface turned in the first axial direction. A technical benefit may include achieving a second interface portion which provides for an easy connection to the device along an axial direction.

Optionally in some examples, including in at least one preferred example, the stem portion of the at least one hook portion is elastically deformable along a transverse direction perpendicular to the main axis. A technical benefit may include achieving a second interface portion which provides for an easy connection to the device along a purely axial direction.

Optionally in some examples, including in at least one preferred example, the stem portion of the at least one hook portion is preferably elastically deformable along a radial direction which is radially oriented with respect to the main axis. A technical benefit may include an axially centered biasing effort, especially in case of diametrically arranged hook portions, which guides the assembling movement when connecting the connector to the device.

Optionally in some examples, including in at least one preferred example, the at least one hook portion may comprise, at a free end the stem portion, an oblique contact surface turned outwards in the second axial direction. A technical benefit may include facilitating the assembling movement when connecting the connector to the device.

Optionally in some examples, including in at least one preferred example, the second interface portion is a bayonet interface. A technical benefit may include achieving a second interface portion which provides for a sturdy connection to the device.

Optionally in some examples, including in at least one preferred example, the at least one hook portion belongs to the bayonet interface. A technical benefit may include achieving a second interface portion which is both sturdy and provides for an easy connection to the device, at a low cost.

Optionally in some examples, including in at least one preferred example, the at least one hook portion is rigid. A technical benefit may include achieving a hook portion in a bayonet connection which is more sturdy.

Optionally in some examples, including in at least one preferred example, the at least one hook portion has an arcuate geometry around the main axis. A technical benefit may include achieving a hook portion which is more sturdy and compact in a bayonet connection.

Optionally in some examples, including in at least one preferred example, the at least one hook portion may comprise a retaining wall which is perpendicular to the main axis, which is spaced from the axial abutment surface, and which is connected axially to the axial abutment surface by an outer circumferential wall and by a radial abutment wall. A technical benefit may include achieving a hook portion which is sturdy and compact in a bayonet connection, and which provides a clear indication to the user that a final position has been reached when connecting the connector to the device.

Optionally in some examples, including in at least one preferred example, the bayonet interface may comprise an elastic lock for locking, around the main axis, an angular position of the device with respect to the rotating connector. A technical benefit may include a reliable connection of the connector to the device.

Optionally in some examples, including in at least one preferred example, the axial abutment surface may be a flat surface extending perpendicularly to the main axis. A technical benefit may include a precise location and orientation of the connector with respect to the device when they are connected one to the other.

Optionally in some examples, including in at least one preferred example, the rotary hub interface may comprise a rotation wall portion which is rotationally symmetrical around the main axis and which extends axially from the first axial extremity to the second axial extremity of the rotary hub interface, and the rotation wall portion may delimit an interior cavity which is axially open in the first axial direction at the first axial extremity. A technical benefit may include achieving a reliable rotary connection between the connector and the attachment stub.

Optionally in some examples, including in at least one preferred example, the rotation wall portion may comprise at least one elastic prong which has a first axial end on the side of the first axial extremity of the rotary hub interface and a second axial end on the side of the second axial extremity of the rotary hub interface, and wherein the at least one elastic prong is attached to the rotation wall portion at its first end while its second end is detached from the rotation wall portion and is biased radially inwards with respect to the rotation wall portion. A technical benefit may include a reliable connection of the connector to the attachment stub.

Also disclosed herein are the following examples of a connecting system for mechanically attaching a device to a support structure.

According to a second aspect of the disclosure, it is disclosed a connecting system for mechanically attaching a device to a support structure, wherein the connecting system comprises a rotating connector according to any preceding examples and an attachment stud.

Optionally in some examples, including in at least one preferred example, the attachment stud may comprise a rotation head configured to be received in the interior cavity delimited by the rotation wall portion of the rotary hub interface of the rotating connector to secure a tool-free mechanical clip-on connection between the attachment stud and the rotating connector.

Optionally in some examples, including in at least one preferred example, the rotation head of the attachment stud may comprise a radial collar having an annular surface axially facing in the first axial direction, wherein the rotation wall portion of the rotating connector comprises at least one elastic prong which has a first end and a second, wherein the at least one elastic prong is attached to the rotation wall portion at its first end while its second end is detached from the rotation wall portion and is offset radially inwards towards the main axis with respect to the rotation wall portion, and wherein, when the rotation head of the attachment stud is fully engaged in the interior cavity delimited by the rotation wall portion of the rotary hub interface of the rotating connector, the second end of the elastic prong of the rotation wall portion of the rotary hub interface of the rotating connector abuts axially against the annular surface of the radial collar to prevent the extraction of the rotation head of the attachment stud from the interior cavity delimited by the rotation wall portion of the rotary hub interface of the rotating connector. A technical benefit may include a reliable connection of the connector to the attachment stub.

Optionally in some examples, including in at least one preferred example, the rotation head of the attachment stud is rotatable around the main axis in the interior cavity of the rotary hub interface of the rotating connector. A technical benefit may include a reliable rotary connection of the connector to the attachment stub.

Optionally in some examples, including in at least one preferred example, the attachment stud may comprise a mount interface for securing the attachment stud to a support structure.

According to a third aspect of the disclosure, it is disclosed an attaching arrangement for mechanically attaching a component to a support structure, wherein the attaching arrangement comprises an attachment bracket on which the component is to be attached, wherein the attaching arrangement comprises a connecting system according to any of the examples above for connecting the attachment bracket to the support structure, and wherein in that the attachment bracket forms said device which is tool-free mechanically connected to the second interface portion of the rotating connector. A technical benefit may include a standardized and easily connectable attaching arrangement where the attachment bracket can be adapted the specific component to be attached.

Optionally in some examples, including in at least one preferred example, the attachment bracket may comprise a flat connecting wall having, on one side, an abutment surface configured to abut the axial abutment surface of the rotating connector, and, on the other side, a hook engagement surface configured to mate with the hook portion of the rotating connector. A technical benefit may include a low production cost for the bracket.

Optionally in some examples, including in at least one preferred example, the flat connecting wall of the attachment bracket may have an aperture through which the hook portion can be inserted axially along the main axis. A technical benefit may include a low production cost for a bracket which can be used in an attachment arrangement where connection between the bracket and the rotary connector is easy and reliable.

Optionally in some examples, including in at least one preferred example, the flat connecting wall of the attachment bracket has a locking surface configured to mate with an elastic prong of the second interface portion of the rotating connector. A technical benefit may include a low production cost for a bracket which can be used in an attachment arrangement where connection between the bracket and the rotary connector is secure.

Optionally in some examples, including in at least one preferred example, the attachment stud of the connection system is secured to the support structure by a mount interface.

According to a fourth aspect of the disclosure, it is disclosed a vehicle comprising a support structure, a component and an attaching arrangement according to any of the examples above for mechanically attaching the component to the support structure. Such vehicle may seek to allow for an easy assembly of the component to the support structure. A technical benefit may include faster, cheaper and/or more ergonomic assembly method Optionally in some examples, including in at least one preferred example, the component is one of an electrical wire or bundle of wires, or hydraulic or pneumatic pipes or bundle of pipes. A technical benefit may include an easier assembly of such component on the vehicle structure.

According to a fifth aspect of the disclosure, it is disclosed a method for mechanically attaching a component to a support structure of a vehicle with an attaching arrangement according to any one of examples above, wherein:

- in a first preliminary operation, the attachment stud is secured to the support structure;
- in a second preliminary operation, which is performed before, after, or in parallel to the first preliminary operation, the attachment bracket is attached to the component;
- a tool free attachment sequence is performed where the rotating connector is clipped-on either:
  - first to the attachment stud, in a first sequence step, and then, in a second sequence step, the attachment bracket is clipped-on to the rotating connector; or,
  - first to the attachment bracket in a first sequence step, and then, in a second sequence step, the rotating connector is clipped-on to the attachment stud.

On an assembly line, the first preliminary operation may be performed at an assembling station where the support structure is easily accessible, even if some tooling is necessary for securing the attachment stud to the support structure. The second preliminary operation may be performed at an assembling station where attachment of the bracket to the component can be performed with ease, even if some tooling is necessary. The two clip-on sequence steps of the tool free attachment sequence can be performed at a point of an assembly process where the use of tools, for performing such steps, may not be practical, for example for lack of accessibility.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

FIG. 1 is a schematic perspective view of an exemplary truck according to an example of a vehicle.

FIG. 2 is an exploded perspective view of a first exemplary attaching arrangement for mechanically attaching a component to a support structure, wherein the first exemplary attaching arrangement comprises a first exemplary attachment bracket on which the component is to be attached, and comprises a connecting system according to a first example.

FIG. 3 is an exploded perspective view of a first exemplary rotating connector of the first example of a connecting system of FIG. 2, and of the first exemplary attachment bracket of the first exemplary attaching arrangement.

DETAILED DESCRIPTION

Figure 4:
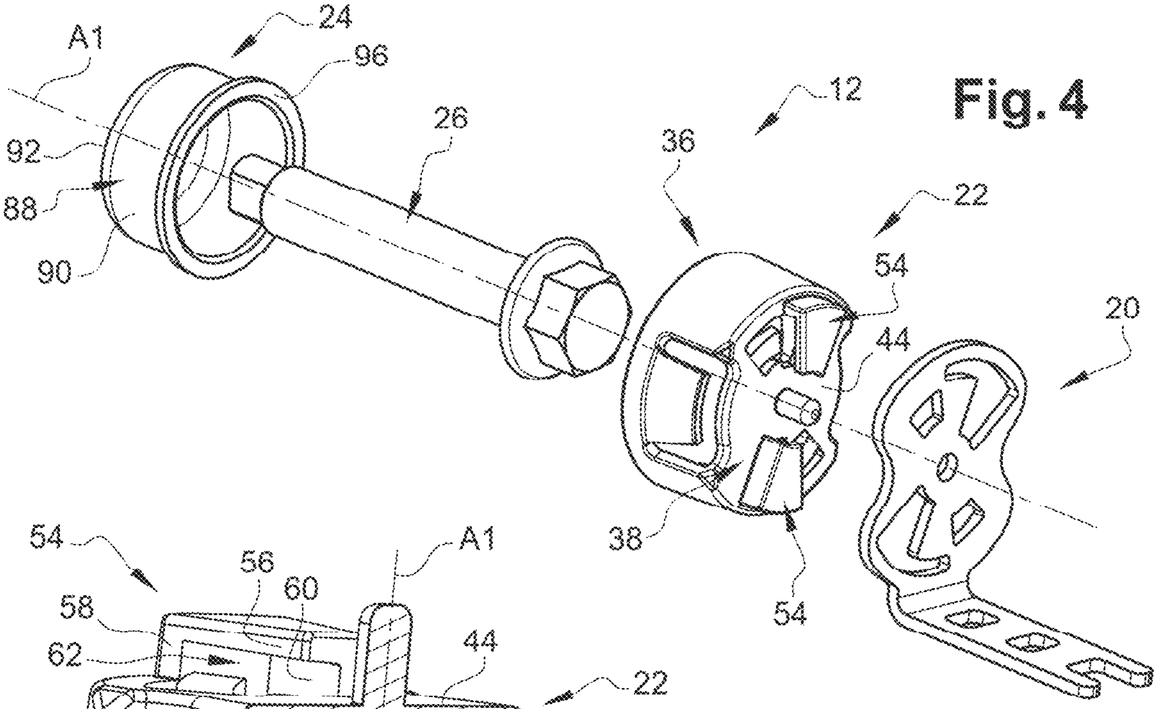
FIG. 4 is an exploded perspective view of a second exemplary attaching arrangement for mechanically attaching a component to a support structure, wherein the second exemplary attaching arrangement comprises a second exemplary attachment bracket on which the component is to be attached, and comprises a connecting system according to a second example.
Figure 5:
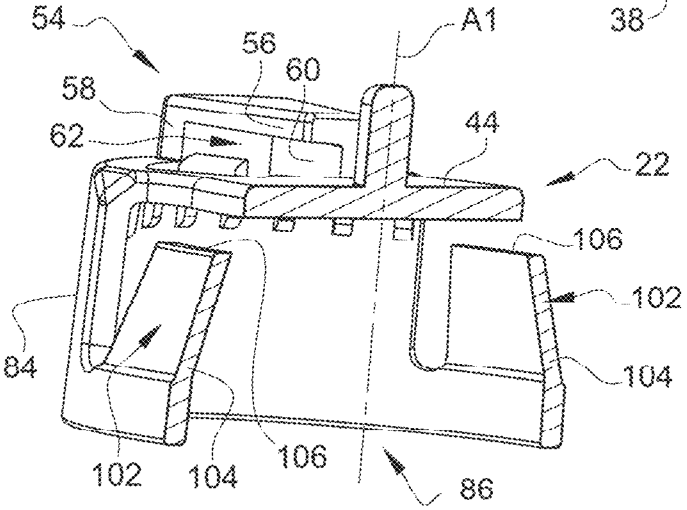
FIG. 5 is a perspective view, with partial cutout, of a second exemplary rotating connector of the second example of the connecting system of FIG. 4.
Figure 6:
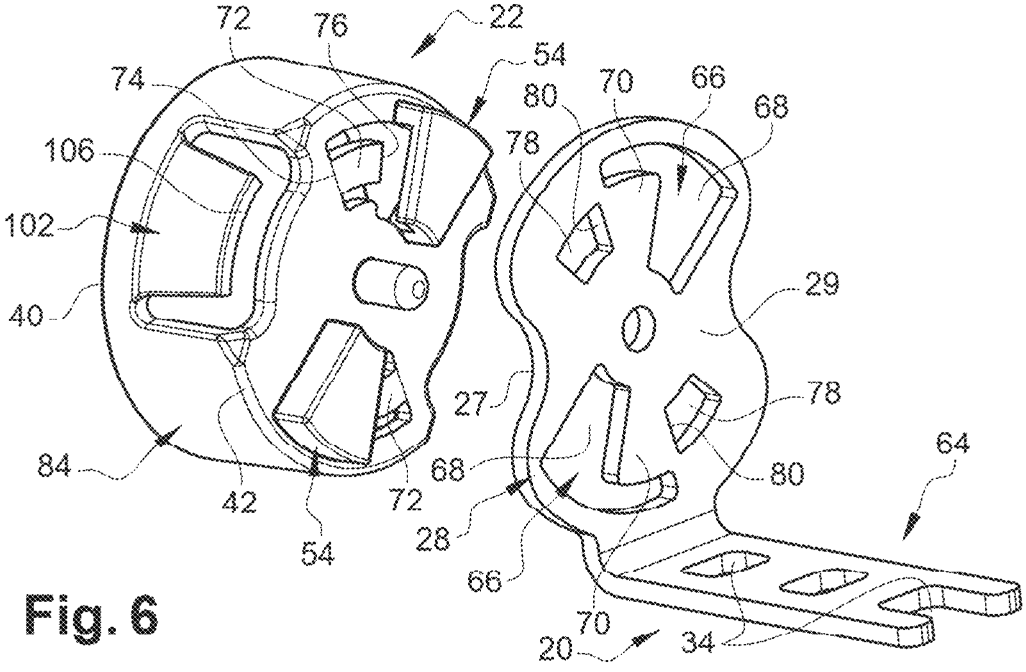
FIG. 6 is a perspective view of the second exemplary attachment bracket, and of the second exemplary rotating connector of the connecting system according to the second example of FIG. 4, in a relative position before connection of the attachment bracket to the rotating connector.
Figure 7:
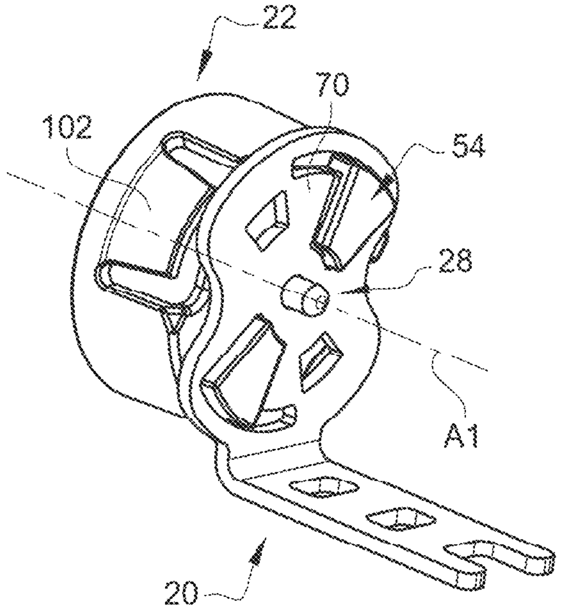
FIG. 7 is a view similar to that of FIG. 6, showing the second exemplary attachment bracket and the second exemplary rotating connector in an intermediate relative position after a first step of connection of the attachment bracket to the rotating connector.
Figure 8:
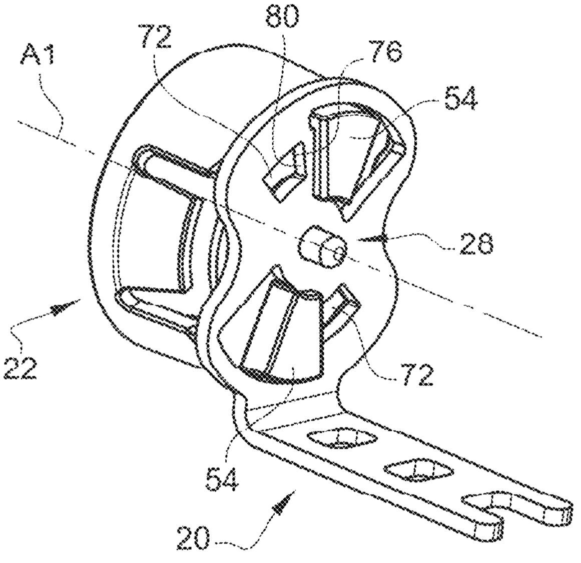
FIG. 8 is a view similar to that of FIGS. 6 and 7, showing the second exemplary attachment bracket connected to the second exemplary rotating connector, after a second step of connection of the attachment bracket to the rotating connector.

The detailed description set forth below provides information and examples of the disclosed technology with sufficient detail to enable those skilled in the art to practice the disclosure.

FIG. 1 shows an automotive vehicle 1 which comprises a cabin 2 mounted on a chassis comprising a frame 3 supported by front wheels 4 and rear wheels 5. The vehicle illustrated is a truck, but the disclosure can also apply to other heavy-duty vehicles, in particular industrial vehicles, such as buses or construction equipment. Z is defined as the vertical direction, X is defined as the longitudinal direction of the vehicle 1, and Y is defined as the lateral direction of the vehicle 1.

In a truck, the frame 3 typically comprises two rails 6 which extend in the longitudinal direction X and are spaced apart one from the other along the lateral direction Y, as well as at least one cross member 7 which extends in the lateral direction Y and which couples the rails 6. The frame 3 may be made of steel or cast iron.

As visible more particularly on FIG. 2, in a typical chassis for a truck, each rail 6 has, in a vertical and lateral plane, a C-shaped cross-section comprising a vertical and longitudinal main flange 8 and, respectively at the upper and lower edges of the main flange 8, upper and lower horizontal flanges 9 extending laterally towards a central longitudinal axis of the vehicle. Typically, the main flange 8 is pierced with an array of through holes 10 for the mechanical attachment of various vehicle components to the rail 6, usually by bolting or riveting. The type of components which may be attached to a chassis frame member include suspension components, driveline components, energy storage components, et cetera. Other components which may be attached to a chassis frame member, but which can also be attached to other support structures of the vehicle including body panels of the vehicle, such as a rear wall of a cabin 2, include elongated conductors which may be or may include any one of an electrical wire or bundle of wires, or hydraulic or pneumatic pipes or bundle of pipes. Such elongated conductors may be flexible. Components which may be attached to a support structure of the vehicle, such as a chassis frame member, can be attached directly by a connecting system. However, in many cases, such components are attached to the support structure via an attachment bracket. The attachment bracket can be easily configured such that the component can be easily secured to the attachment bracket. In some cases, several components or several parts of the same component can be secured on the same attachment bracket which can itself be attached to the support structure, allowing for an easy attachment of said several components or several parts of the same component to the support structure, said attachment being for example possible in single operation.

On FIG. 2 is shown a first example of an attaching arrangement 12 for mechanically attaching a component 14, here a bundle 14 of elongated conductors 16, to a support structure, which, in the depicted example, is the chassis frame rail 6. A second example of such an attaching arrangement 12 will be described in relation to FIGS. 4-10.

In both examples, the attaching arrangement 12 comprises a connecting system 18 for mechanically attaching, directly or indirectly, the component 14 to the support structure 6. While, the component 14 could be directly mechanically connected to the connecting system 18, the attaching arrangement 12 depicted on FIG. 2 comprises a device, which is here in the form of an attachment bracket 20, via which the component 14 is indirectly mechanically connected to the connecting system 18. In non-depicted examples where the connecting system 18 directly attaches the component 14 to the support structure 6, the device is the component itself.

The connecting system 18 comprises a rotating connector 22 and an attachment stud 24. The rotating connector 22 is configured for mechanically attaching the device, here the attachment bracket 20, to the support structure 6 via the attachment stud 24.

On FIG. 2, the attachment stud 24 is shown to be secured to the support structure, in the example on an internal side of the main flange 8 of rail 6. In the example, the attachment stud 24 is shown to be secured to the support structure by a bolt 26. However, the attachment stud 24 could alternatively be secured by riveting or other mechanical attachment, by gluing, by welding. In other examples, the attachment stud 24 could alternatively be integral with the support structure, i.e. made in one piece with the support structure or a portion thereof.

On FIG. 2, the attachment bracket 20 is shown to be connected to the rotating connector 22. In this example, the attachment bracket 20 is metallic, for example made of sheet metal. In this example, the attachment bracket 20 is made of a single piece of material. In the example the attachment bracket 20 is a sheet metal bracket made by cutting out and folding a sheet of metal. However, in other examples, the attachment bracket 20 can be made of other material, including polymer material, and/or composite material comprising reinforcing particles or fibers embedded in a polymer matrix.

Details of the first exemplary attachment bracket 20 and of the first exemplary rotating connector 22 of FIG. 2 are more clearly visible on FIG. 3.

In this example, the attachment bracket 20 has a flat connecting wall 28, extending in a longitudinal and vertical plane. In the example, the flat connecting wall 28 comprises connecting features 31 for directly connecting the attachment bracket 20 to the rotating connector 22. A flat spacer wall 30 extends in a horizontal plane from a top edge of the flat connecting wall 28. A hanging flat wall 32 extends in a longitudinal and vertical plane, downwardly from a longitudinal edge of the flat spacer wall 30. In this example, the hanging flat wall 32 is laterally spaced apart from the flat connecting wall 28 along the lateral axis Y. In this example, the hanging flat wall 32 is parallel to the flat connecting wall 28, and is at least in part facing the flat connecting wall 28, providing the attachment bracket with a U-shaped configuration when viewed along the longitudinal direction. The hanging flat wall 32 may advantageously comprise attaching features, such as apertures, holes and cut-outs 34 for attaching the component 14 to the attachment bracket 20.

The rotating connector 22 comprising a first interface portion 36 for a rotating tool-free mechanical clip-on connection to the attachment stud 24 and a second interface portion 38 for a tool-free mechanical clip-on connection to the device, i.e., in the depicted examples, the attachment bracket 20. Both tool-free mechanical clip-on connections allow for the rotating connector to be mechanically connected to the corresponding member, (i.e. respectively the attachment stud 24 and the device, i.e., in the depicted examples, the attachment bracket 20) without the use of a tool and without the use of other independent fastener (glue, bolts, screws, rivets, pins, etc. . . . ), by mere engagement of the rotating connector with the corresponding member.

The first interface portion 36 is a rotary hub interface having a main axis A1 and extending axially along its axis A1, in a first axial direction, to a first axial extremity 40 and, in a second axial direction opposite to the first axial direction, to a second axial extremity 42. The second interface portion 38 is located at the second axial extremity 42 of the rotary hub interface 36.

The second interface portion 38 comprises an axial abutment surface 44, which provides abutment along the axial direction of the main axis. The axial abut surface is turned outwards in the second axial direction. The axial abutment surface 44 may for example be a flat surface extending perpendicularly to the main axis A1, as shown in the example. However, it may have a different geometry, such as, for example, without limitation, a conical or spherical geometry.

Common to the depicted examples, the second interface portion 38 comprises at least one hook portion, which extends axially in the second axial direction with respect to the axial abutment surface 44, for hooking onto the device 20, which, in the examples, is the attachment bracket 20.

In the example of FIGS. 2 and 3, the second interface portion 38 forms a clipping interface whereby the device, here the attachment bracket 20, may be connected to the rotating connector 22 by a purely axial relative movement along the direction of the main axis A1. In the depicted example, the second interface portion 38 comprises more than one hook portion 46, for example six hook portions in the shown example, which are angularly spread around the main axis A1. For example, the six hook portions 46 are angularly spaced along a circle around the main axis A1.

Each hook portion 46 comprises a stem portion 48 which extends in the second axial direction away from the axial abutment surface 44 and comprises, at a free end of the stem portion, a hooking surface 50 turned in the first axial direction, i.e. facing the axial abutment surface 44. The hooking surface 50 extends in an overhang position with respect to the stem portion 48. In this example, the stem portion 48 is elastically deformable along a transverse direction perpendicular to the main axis A1. In the example, the stem portion 48 is elastically deformable along a radial direction which is radially oriented with respect to the main axis A1. Each hook portion 46 comprises, at a free end of the stem portion 48, an oblique contact surface 52 turned outwards in the second axial direction. The oblique contact surface faces in a direction which is somewhat opposite to the direction in which faces the hooking surface 50.

The device, here the attachment bracket 20, has connecting features 31 which are complementary to the second interface portion 38, to engage with the second interface portion 38 so as to form a tool-free mechanical clip-on connection between the rotating connector 22 and the device, i.e., in the depicted examples, the attachment bracket 20.

In the examples, the flat connecting wall 28 has, on one side, an abutment surface 27 configured to abut the axial abutment surface 44 of the rotating connector 22, and, on the other side, a hook engagement surface 29 configured to mate with the hook portion 46 of the rotating connector 22.

In some examples, such as the example of FIGS. 2 and 3, the connecting features 31 comprise at least one aperture 33 in the flat connecting wall 28 of the attachment bracket 20. The at least one aperture 33 corresponds to the at least one hook portion 46, for allowing the at least one hook portion 46 to be inserted through the aperture 33. During such insertion, the oblique contact surface 52 of each hook portion 46 contacts a peripheral edge 35 of the aperture 33 to cause the stem portion 48 to deform elastically inwardly along a radial direction which is radially oriented towards the main axis A1. When the abutment surface 27 of the flat connecting wall 28 abuts against the axial abutment surface 44, the oblique hook engagement surface 52 of the at least one hook portion has axially passed an opposite hook engagement surface 29 of the flat connecting wall 28 to allow the stem portion 48 to spring back to its initial position. At that time, the hooking surface 50 faces said opposite hook engagement surface 29 of the flat connecting wall 28 to prevent disconnection of the device, here the attachment bracket 20, from the second interface portion 38. In the example of FIGS. 2 and 3, the aperture 33 exhibits a circular peripheral edge 35 which is circular around the main axis A1, and which faces axially each of the hook portions 46.

In some examples, such as the example of FIGS. 2 and 3, the connecting features 31 of the device 20 and the second interface portion 38 of the rotary connector 22 have complementary features to prevent relative rotation of the device 20 and of the rotary connector 22 with respect one to the other around the main axis A1, when they are connected. The complementary features may comprise an index 37 pertaining to the device 20 which abuts angularly with the at least one hook portion 46 of the rotary connector 22 to block any relative rotation of the device 20 and of the rotary connector 22 with respect one to the other around the main axis A1. In some examples, such as the example of FIGS. 2 and 3, the index comprises at least one radial protrusion 37, which extends towards the main axis A1 with respect to the circular edge 35. Each radial protrusion 37 abuts angularly against at least one hook portion 46 to block relative rotation around at least one direction. In the shown example, each radial protrusion 37 extends between two neighboring hook portions 46 and abuts angularly against each of said two neighboring hook portions 46 to block relative rotation around both directions around the main axis A1.

In some examples, such as the example of FIGS. 4 to 10, the at least one hook portion 54 of the second interface portion 36 of the rotary connector 22 belongs to a bayonet interface. The second interface portion 38 thus forms a bayonet interface whereby the device, here the attachment bracket 20, may be connected to the rotating connector 22 by an axial relative insertion movement along the direction of the main axis A1, as shown by comparing FIGS. 6 and 7, to reach an intermediate relative position shown on FIG. 7, followed by a rotational relative movement around the main axis A1, as shown by comparing FIGS. 7 and 8, to reach the final connected relative position shown on FIG. 8. In some examples, such as the example of FIGS. 4 to 10, the second interface portion 38 comprises more than one hook portion 54. In some examples, such as the example of FIGS. 4 to 10, the second interface portion 38 comprises two hook portions 54, which are diametrically opposite one to the other with respect to the main axis A1.

In such a bayonet interface, the at least one hook portion 54 may be rigid, i.e. without any substantial deformation in use, both during the connection of the device 20 and the rotary connector 22, and during subsequent use of the system, including during operation of the vehicle equipped with such attaching arrangement for mechanically attaching a component to a support structure.

In some examples, such as the example of FIGS. 4 to 10, the at least one hook portion 54 has an arcuate geometry around the main axis A1. For example, and as most visible in FIG. 5, each hook portion 54 comprises a retaining wall 56, which is perpendicular to the main axis A1, which is spaced from the axial abutment surface 44, and which is connected axially to the axial abutment surface 44 by an outer circumferential wall 58 and by a radial abutment wall 60. The hook portion 54 thus defines, between the retaining wall 56, the axial abutment surface 44, the circumferential wall 58 and the radial abutment wall 60, a retaining recess 62.

In some examples, such as the example of FIGS. 4 to 10, the device, here the attachment bracket 20, comprises a flat connecting wall 28, extending in a longitudinal and vertical plane. In the example, the flat connecting wall 28 comprises connecting features 66 for directly connecting the attachment bracket 20 to the rotating connector 22. For example, the attachment bracket 20 may further comprise a flat hanging wall 64, which extends perpendicularly to the flat connecting wall 28, providing the attachment bracket 20 with a L-shaped configuration when viewed along the longitudinal direction. The flat hanging wall 64 may advantageously comprise attaching features, such as apertures, holes and cut-outs 34 for attaching the component 14 to the attachment bracket 20.

The device, here the attachment bracket 20, has connecting features 66 which are complementary to the second interface portion 38 to engage with the second interface portion 38 so as to form a tool-free mechanical clip-on connection of the bayonet type between the rotating connector 22 and the device, i.e., in the depicted examples, the attachment bracket 20. In the example, the connecting features 66 comprise at least one hook aperture 68 in the flat connecting wall 28 of the attachment bracket 20. The at least one aperture 68 corresponds to the at least one hook portion 54, for allowing the at least one hook portion 54 to be inserted through the hook aperture 68 by an insertion translation along the main axis A1, and for allowing the circumferential wall 58 and the radial abutment wall 60 to pivot within the hook aperture 68 when the rotating connector 22 and the device, here the attachment bracket 20, are pivoted relatively one to the other around the main axis A1 from the intermediate position shown on FIG. 7 to the connected position shown on FIG. 8. On one side of each hook aperture 68, the connecting features 66 of the device, here the attachment bracket 20, comprise a radial retaining leaf 70, which is a portion of the flat connecting wall 28. When the rotating connector 22 and the device, here the attachment bracket 20, are pivoted relatively one to the other around the main axis A1 from the insertion position of FIG. 7 to the connected position of FIG. 8, the radial retaining leaf 70 enters circumferentially into the retaining recess 62. The radial retaining leaf 70 is then axially imprisoned in the retaining recess 62 by the retaining wall 56. Preferably, the radial retaining leaf 70 abuts angularly against the radial abutment wall 60 of the hook portion 54 to prevent any further rotation relative rotation in the same direction. Preferably, the flat connecting wall 28 is, in that configuration, axially pressed against the axial abutment surface 44 to suppress any axial movement between the device 20 and the rotary connector 22.

In the shown embodiment, the connecting features 66 of the device 20 and the second interface portion 38 of the rotary connector 22 have complementary features to prevent relative rotation of the device 20 and of the rotary connector 22 with respect one to the other around the main axis A1, when they are connected. The complementary features may comprise an elastic lock for locking, around the main axis A1, an angular position of the device 20 with respect to the rotating connector 22. In the example of FIGS. 4 to 10, the elastic lock comprises at least one elastic prong 72 formed on the rotary connector 22, for example formed on the axial abutment surface 44, and a lock window 78 formed on the device, as a part of the connecting features 66. The elastic prong 72 extends along a tangential direction with respect to the main axis A1, for example along an arc of a circle around the main axis A1. The clastic prong 72 has a first circumferential end 74 and a second circumferential end 76, wherein the at least one elastic prong 72 is attached to the axial abutment surface 44 at its first end 74 while its second end is detached from the axial abutment surface 44 and is, at rest, axially offset outwards with respect to the axial abutment surface 44. When the attachment bracket 20 and the rotating connector 22 are brought to their intermediate relative position shown on FIG. 7 by the axial relative insertion movement along the direction of the main axis A1, the flat connecting wall 28 presses the second axial end 76 of the elastic prong 72 to a position where it is flush with the axial abutment surface 44. When the rotating connector 22 and the device, here the attachment bracket 20, are pivoted relatively one to the other around the main axis A1 to the connected position of FIG. 8, the lock window 78 of the device 20 faces the second axial end 76 of the elastic prong 72 and allows the elastic prong 72 to spring back to its rest position where the second circumferential end 76 of the elastic prong 72 enters the lock window 78 to abut against a locking edge 80 of the lock window 78, preventing any reverse relative rotation of the rotating connector 22 and the device 20 from the connected position of FIG. 8. The rotating connector 22 and the device, here the attachment bracket 20, are then locked in their connected position of FIG. 8. In the example, the second interface portion 38 comprises two elastic locks, which are diametrically opposite one to the other with respect to the main axis A1, and which each comprise an elastic prong 72 and a lock window 78 as described above.

In some examples, including the examples shown in FIGS. 2 to 10, when the device 20, for example the attachment bracket 20, is mechanically connected to the rotating connector 22, no relative rotation can occur between the device 20 and the rotating connector around the main axis A1.

In many cases, especially in the case of an attaching arrangement 12 for mechanically attaching one elongated conductor 16 or a bundle 14 of elongated conductors 16, most notably in the case of flexible conductors, to a support structure, especially a rigid support structure, if may be advantageous to provide some possibility, in particular an attachment bracket 20, to adjust the orientation of device, for example of the attachment bracket 20, around the main axis A1. This may allow for an easier connection and, in the case of elongated conductors 16, an easier routing.

Therefore, in some examples, such as the examples of FIGS. 2 to 10, the connection system 18 comprising the rotating connector 22 and the attachment stud 24 allows a free rotation of the rotating connector 22 with respect to the attachment stud 24 around the main axis A1, at least along an angular range which is preferable superior to 10 degrees, preferably superior to 20 degrees around the main axis A1. In the shown examples of FIGS. 2 to 10, the connection system 18 allows a free unlimited rotation of the rotating connector 22 with respect to the attachment stud 24 around the main axis A1.

In some examples, including the examples shown in FIGS. 2 to 10, the first interface portion 36 is a rotary hub interface comprising a rotation wall portion 84, which is rotationally symmetrical around the main axis A1. The rotation wall portion 84 extends axially from the first axial extremity 40, where it exhibits a circular free edge, to the second axial extremity 42 of the rotary hub interface 36, where it connects to the axial abutment surface 44 along a circular connecting edge. In the examples, the rotation wall portion 84 has a general shape of a cylinder around the main axis A1, with however a degree of conical shape, the free edge at the first extremity 40 having a diameter around the main axis A1 which is superior to the diameter of the connecting edge at the second extremity 42. The rotation wall portion 84 delimits an interior cavity 86, visible for example on FIGS. 9 and 10, which is axially open in the first axial direction at the first axial extremity 40. In the example, the interior cavity 86 is axially closed in the second axial direction at the second axial extremity 42.

Figure 9:
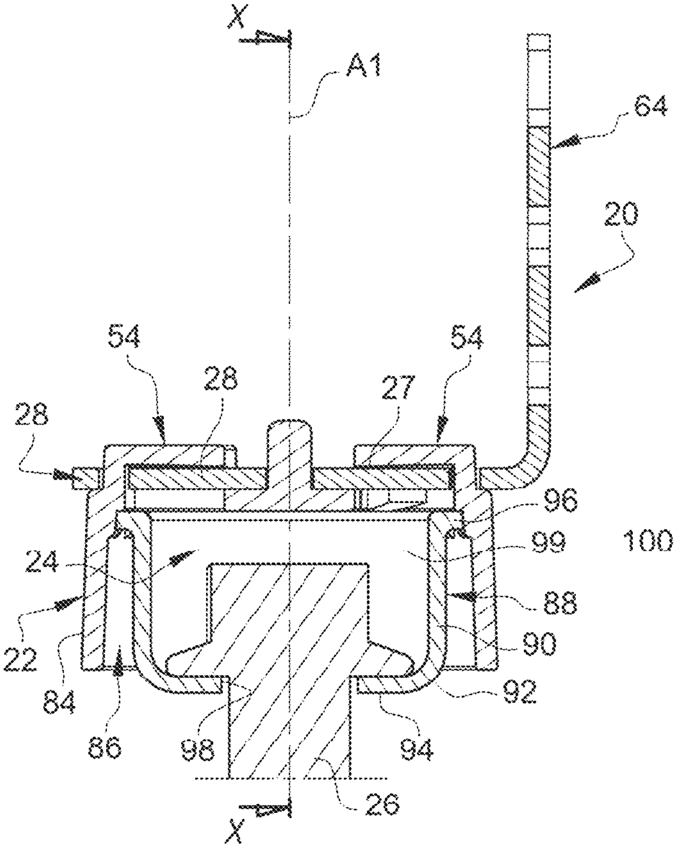
FIG. 9 is a cutout view of the second exemplary attaching arrangement of FIG. 4, along line IX-IX of FIG. 10.
Figure 10:
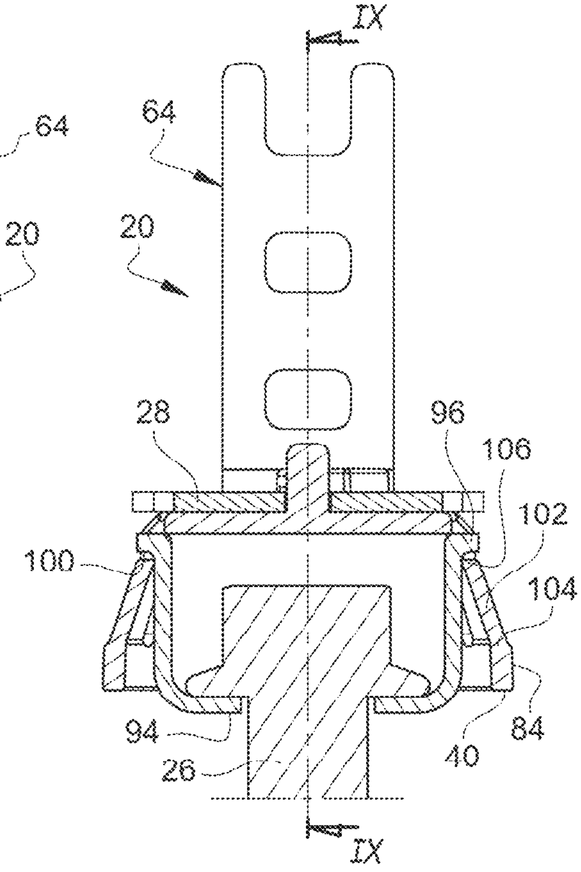
FIG. 10 is a cutout view of the second exemplary attaching arrangement of FIG. 4, along line X-X of FIG. 9.
Figure 11:
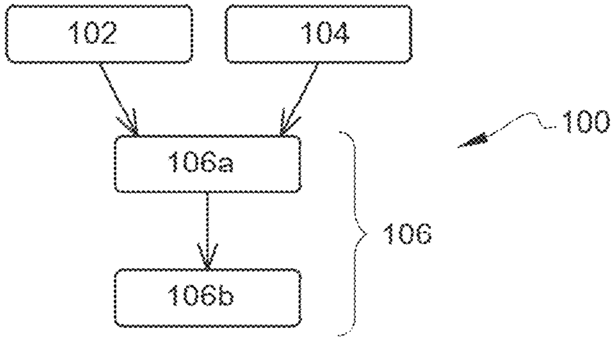
FIG. 11 is a is a diagram illustrating a method for mechanically attaching a component to a support structure of a vehicle.

As visible on FIGS. 4, 9 and 10, the attachment stud 24 comprises a rotation head 88 which is configured to be received in the interior cavity 86 delimited by the rotation wall portion 84 of the rotary hub interface 36 of the rotating connector 22 to secure a tool-free mechanical clip-on connection between the attachment stud 24 and the rotating connector 22. In the depicted embodiments, the rotation head 88 is cup shaped, and exhibits a rotation wall portion 90, which is rotationally symmetrical around the main axis A1. The rotation wall portion 90 extends axially from a first axial extremity 92, where it connects to an axial abutment surface 94 along a circular connecting edge, to a second axial extremity where it exhibits a radial collar 96.

In some examples, including the examples shown in FIGS. 2 to 10, the abutment surface 94 of the attachment stud forms part of a mount interface for securing the attachment stud 24 to a support structure, in the example to the main flange 8 of the rail 6. For example, the abutment surface 94 is a surface of a transverse wall of the attachment stud 24, located at the first axial extremity 92 of the rotation wall portion 90. In the example, the transverse wall has a central axial through hole 98 through which the bolt 26 is inserted for bolting the attachment stud 24 to the support structure, thus axially pressing the axial abutment surface 94 against the support structure along the main axis A1. The rotation wall portion 90 delimits an interior cavity 99, visible for example on FIGS. 9 and 10, which is axially open in the second axial direction at the second axial extremity. In the example, the head of the bolt 26 is accommodated in the interior cavity 99 of the attachment stud 24.

The attachment stud 24 can be made of injection molded polymer material, which may be reinforced with reinforcing fibers and/or reinforcing particles, or made of metal for example by molding or by stamping.

In some examples, including the examples shown in FIGS. 2 to 10, the radial collar 96 extends outwardly from the main axis A1 with respect to the rotation wall portion 90 of the attachment stud 24. The radial collar 96, arranged at the second axial extremity 92, has an annular surface 100 axially facing in the first axial direction, at a distance axially from the axial abutment surface 94, thus from the support structure 6. The external diameter around the main axis A1 of the radial collar 96 is slightly smaller than the internal diameter of the interior cavity 86 of the rotary connector 22, allowing for the rotation head 88 to be received in the interior cavity 86 delimited by the rotation wall portion 84 of the rotary hub interface 36 of the rotating connector 22, and to allow full unlimited rotation of the rotating connector 22 around the rotation head 88 of the attachment stud 24. In other words, the rotation head 88 of the attachment stud 24 is rotatable around the main axis A1 in the interior cavity 86 of the rotary hub interface 36 of the rotating connector 22.

In some examples, including the examples shown in FIGS. 2 to 10, the rotation wall portion 84 of the rotating connector 22 comprises at least one elastic prong 102 which has a first axial end 104 on the side of the first axial extremity 40 of the rotary hub interface 36 and a second axial end 106 on the side of the second axial extremity 42 of the rotary hub interface 36. The at least one elastic prong 102 is attached to the rotation wall portion 84 at its first end 104 while its second end is detached from the rotation wall portion 84 and is offset radially inwards towards the main axis A1 with respect to the rotation wall portion 84. In the examples, the elastic prong 102 is oriented axially from its first end 104 to its second end. However, a different orientation is possible, including with an angle with respect to the main axis A1.

As visible in FIG. 10, when the rotation head 88 of the attachment stud 24 is fully engaged in the interior cavity 86 delimited by the rotation wall portion 84 of the rotary hub interface 36 of the rotating connector 22, the second end 106 of the elastic prong 102 of the rotation wall portion 84 of the rotary hub interface 36 of the rotating connector 22 abuts axially against the annular surface 100 of the radial collar, to prevent the extraction of the rotation head 88 of the attachment stud 24 from the interior cavity 86 delimited by the rotation wall portion 84 of the rotary hub interface 36 of the rotating connector 22.

The rotating connector 22 can be mounted on the rotation head 28 of the attachment stud 24 by mere insertion along the first axial direction. During such insertion, the radial collar 96 interferes with the at least one elastic prong 102 of the rotary connector to elastically and outwardly push the clastic prong 105 along a radial direction away from the main axis A1, until the second end 106 of the rotating connector 22 has passed over the collar 96 to allow the elastic prong 102 to spring back to its initial position, where its second end 106 abuts axially against the annular surface 100 of the radial collar to prevent disconnection of the rotating connector 22 from the attachment stud 24. In the example, the rotating connector 22 comprises two clastic prongs 102, which are diametrically opposite one to the other with respect to the main axis A1.

It has thus been described an attaching arrangement 12 for mechanically attaching a component 14 to a support structure 6, wherein the attaching arrangement 12 comprises an attachment bracket 22 on which the component 14 is to be attached. The attaching arrangement 12 comprises a connecting system 18 for connecting the attachment bracket 20 to the support structure 8. The connecting system 18 comprises a rotating connector 22 and an attachment stud 24. The connecting system 18 allows for a tool-free mechanical clip-on connection of the attachment bracket 20 to rotating connector 22. The connecting system 18 allows also for a tool-free mechanical clip-on connection of the rotating connector 22 to the attachment stud 24. In a first preliminary operation, the attachment stud 24 may be secured to the support structure 6. On an assembly line, this may be done at an assembling station where the support structure 6 is easily accessible, even if some tooling is necessary for securing the attachment stud 24 to the support structure 6. In a second preliminary operation, which can be performed before, after, or in parallel to the first preliminary operation, the attachment bracket 22 is attached to the component 14. On an assembly line, this may be done at an assembling station where such attachment can be performed with case, even if some tooling is necessary. Then, after the first and second preliminary operations, a tool free attachment sequence may be performed where the rotating connector 22 is clipped-on either first to the attachment stud 24, in a first sequence step, and then, in a second sequence step, the attachment bracket 22 is clipped-on to the rotating connector 22, or, preferably, first to the attachment bracket 22, in a first sequence step, and then, in a second sequence step, the rotating connector 22 is clipped-on to the attachment stud 24. On an assembly line, the two sequence steps of the tool free attachment sequence can be performed at a single assembly station, or can be performed at two separate and spaced apart assembly stations of the assembly line. The two clip-on sequence steps of the tool free attachment sequence can be performed at a point of an assembly process where the use of tools, for performing such steps, may not be practical, for example for lack of accessibility.

In the disclosed embodiment, the attachment bracket 20 has a flat connecting wall 28 comprising connecting features 31, 66 for directly connecting the attachment bracket 20 to the rotating connector 22, where the connecting features 31, 66 are made of apertures, holes, cut-outs, etc. . . . , such that the attachment bracket 20, including its connecting features 31, 66 can be made from sheet metal, for example by cutting out, folding, punching, and/or die-cutting a sheet of metal, using well known techniques for forming brackets at low cost. Thus, attachments brackets can be designed to be suitable to the exact configuration and to the exact environment of a given attaching arrangement, for mechanically attaching a given type and/or shape of a device to a given type or shape of support structure.

On the other hand, the rotating connector exhibits the geometrically more complex structures such as the hook portions, the elastic locks, the elastic prongs, the rotation wall portions, etc. . . . As shown on the Figures, the rotating connector 22, including its a first interface portion 36 and its second interface portion 38, is preferably made of a single piece of material.

The rotating connector 22 can be made of injection molded polymer material, which may be reinforced with reinforcing fibers and/or reinforcing particles. The rotating connector 22 can be a standardized part used for different attaching arrangements, for mechanically attaching different types and/or shapes of devices to different types or shapes of support structures. Such a rotating connector 22 can thus be mass-produced at a reasonable or even low cost, even in cases where relatively expensive tooling would be necessary for its production. Of course, the connecting features 31, 66 of each of the different types or shapes of attachment brackets 20 are preferably standardized, to match the second interface portion 38 of a standardized rotating connector 22.

Also disclosed herein are the following examples of a rotating connector.

Example 1: A rotating connector (22) for mechanically attaching a device (20) to a support structure (6) via an attachment stud (24), wherein the rotating connector (22) comprises a first interface portion (36) for a rotating tool-free mechanical clip-on connection to the attachment stud (24) and a second interface portion (38) for a mechanical connection to the device (20), wherein the first interface portion (36) is a rotary hub interface having a main axis (A1) and extending axially along its main axis (A1), in a first axial direction, to a first axial extremity (40) and, in a second axial direction opposite to the first axial direction, to a second axial extremity (42), wherein the second interface portion (38) is located at the second axial extremity (42) of the rotary hub interface (36), and wherein the second interface portion (38) is a tool-free mechanical clip-on connection to the device (20).

Example 2: Rotating connector (22) according to Example 1, wherein the second interface portion (38) comprises an axial abutment surface (44) turned outwards in the second axial direction, and wherein the second interface portion (38) comprises at least one hook portion (46, 54) which extends axially in the second axial direction with respect to the axial abutment surface (44) for hooking onto the device (20).

Example 3: Rotating connector (22) according to Example 1, wherein the at least one hook portion (46) comprises a stem portion (48) which extends in the second axial direction away from the axial abutment surface (44) and comprises, at a free end of the stem portion (48), a hooking surface (50) turned in the first axial direction.

Example 4: Rotating connector (22) according to Example 3, wherein the stem portion (48) of the at least one hook portion (46) is elastically deformable along a transverse direction perpendicular to the main axis (A1).

Example 5: Rotating connector (22) according to any one of Examples 3 or 4, wherein the stem portion (48) of the at least one hook portion (46) is elastically deformable along a radial direction which is radially oriented with respect to the main axis (A1).

Example 6: Rotating connector (22) according to any one of Examples 3 to 5, wherein the at least one hook portion (46) comprises, at a free end the stem portion (48), an oblique contact surface (52) turned outwards in the second axial direction.

Example 7: Rotating connector (22) according to Example 1 or 2, wherein the second interface portion (38) is a bayonet interface.

Example 8: Rotating connector (22) according to Example 7 in combination with the features of Example 2, wherein the at least one hook portion (54) belongs to the bayonet interface.

Example 9: Rotating connector according to Example 8, wherein the at least one hook portion (54) is rigid.

Example 10: Rotating connector (22) according to any one of Examples 8 or 9, wherein the at least one hook portion (54) has an arcuate geometry around the main axis (A1).

Example 11: Rotating connector (22) according to any one of Examples 8 to 10, wherein the at least one hook portion (54) comprises a retaining wall (56) which is perpendicular to the main axis, which is spaced from the axial abutment surface (44), and which is connected axially to the axial abutment surface (44) by an outer circumferential wall (58) and by a radial abutment wall (60).

Example 12: Rotating connector (22) according to any one of Examples 8 to 11, wherein the bayonet interface comprises an elastic lock (72, 80) for locking, around the main axis (A1), an angular position of the device (20) with respect to the rotating connector (22).

Example 13: Rotating connector (22) according to any one of the preceding Examples, wherein the axial abutment surface (44) is a flat surface extending perpendicularly to the main axis (A1).

Example 14: Rotating connector (22) according to any one of the preceding Examples, wherein the rotary hub interface comprises a rotation wall portion (84) which is rotationally symmetrical around the main axis (A1) and which extends axially from the first axial extremity to the second axial extremity of the rotary hub interface, and wherein the rotation wall portion (84) delimits an interior cavity (86) which is axially open in the first axial direction at the first axial extremity (40).

Example 15: Rotating connector (22) according to Example 14, wherein the rotation wall portion (84) comprises at least one elastic prong (102) which has a first axial end (104) on the side of the first axial extremity of the rotary hub interface (36) and a second axial end (106) on the side of the second axial extremity of the rotary hub interface (36), and wherein the at least one clastic prong (102) is attached to the rotation wall portion (84) at its first end (104) while its second end (106) is detached from the rotation wall portion (84) and is biased radially inwards with respect to the rotation wall portion (84).

Also disclosed herein are the following examples of a connecting system (18) for mechanically attaching a device (20) to a support structure (6).

Example 16: Connecting system (18) for mechanically attaching a device (20) to a support structure (6), wherein it comprises a rotating connector (22) according to any preceding Examples and an attachment stud (24).

Example 17: Connecting system (18) according to Example 16 in combination with the features of any one of Examples 14 or 15, wherein the attachment stud (24) comprises a rotation head (88) configured to be received in the interior cavity (86) delimited by the rotation wall portion (84) of the rotary hub interface of the rotating connector (22) to secure a tool-free mechanical clip-on connection between the attachment stud (24) and the rotating connector (22).

Example 18: Connecting system (18) according to Example 17, wherein the rotation head (88) of the attachment stud (24) comprises a radial collar (96) having an annular surface (100) axially facing in the first axial direction, wherein the rotation wall portion (84) of the rotating connector (22) comprises at least one clastic prong (102) which has a first end (104) and a second (106), wherein the at least one elastic prong (102) is attached to the rotation wall portion (84) at its first end (104) while its second end is detached from the rotation wall portion (84) and is offset radially inwards towards the main axis (A1) with respect to the rotation wall portion (84) wherein, when the rotation head (88) of the attachment stud (24) is fully engaged in the interior cavity (86) delimited by the rotation wall portion (84) of the rotary hub interface of the rotating connector (22), the second end (106) of the elastic prong (102) of the rotation wall portion (84) of the rotary hub interface of the rotating connector (22) abuts axially against the annular surface (100) of the radial collar (96) to prevent the extraction of the rotation head (88) of the attachment stud (24) from the interior cavity (86) delimited by the rotation wall portion (84) of the rotary hub interface of the rotating connector (22).

Example 19: Connecting system (18) according to any one of Examples 17 or 18, wherein the rotation head (88) of the attachment stud (24) is rotatable around the main axis (A1) in the interior cavity (86) of the rotary hub interface of the rotating connector (22).

Example 20: Connecting system according to any one of Examples 16 to 19, wherein the attachment stud (24) comprises a mount interface (94, 98) for securing the attachment stud (24) to a support structure (6).

Also disclosed herein are the following examples of an attaching arrangement (12) for mechanically attaching a component (14, 16) to a support structure (6).

Example 21. Attaching arrangement (12) for mechanically attaching a component (14, 16) to a support structure (6), wherein the attaching arrangement (12) comprises an attachment bracket (20) on which the component (14, 16) is to be attached, wherein the attaching arrangement comprises a connecting system (18) according to Examples 16-20 for connecting the attachment bracket (20) to the support structure (6), and wherein in that the attachment bracket (20) forms said device which is tool-free mechanically connected to the second interface portion (38) of the rotating connector (22).

Example 22: Attaching arrangement according to Example 21, wherein the device (20) comprises a flat connecting wall (28) having, on one side, an abutment surface (27) configured to abut the axial abutment surface (44) of the rotating connector (22), and, on the other side, a hook engagement surface (29) configured to mate with the hook portion (46, 54) of the rotating connector (22).

Example 23: Attaching arrangement according to Example 22, wherein the flat connecting wall (28) of the device (20) has an aperture (33, 68) through which the hook portion (46, 54) can be inserted axially along the main axis (A1).

Example 24. Attaching arrangement according to any one of Examples 22 or 23, wherein the flat connecting wall (28) of the device (20) has a locking surface (80) configured to mate with an elastic prong (72) of the second interface portion (38) of the rotating connector (22).

Example 25. Attaching arrangement according to any one of Examples 21 to 23, wherein the attachment stud (24) of the connection system (18) is secured to the support structure (6) by a mount interface (94, 98).

Also disclosed herein are the following examples of a vehicle.

Example 26. Vehicle comprising a support structure (6), a component (14, 16) and an attaching arrangement (12) for mechanically attaching the component (14, 16) to the support structure (6), wherein the attaching arrangement is according to any of Examples 21-25.

Example 27: Vehicle according to Example 26, wherein the component (14, 16) is one of an electrical wire or bundle of wires, or hydraulic or pneumatic pipes or bundle of pipes.

Also disclosed herein is the following example of a method.

Example 28: Method (100) for mechanically attaching a component (14, 16) to a support structure (6) of a vehicle with an attaching arrangement according to any one of Examples 21 to 25, wherein:

- in a first preliminary operation (102), the attachment stud (24) is secured to the support structure (6);
- in a second preliminary operation (104), which is performed before, after, or in parallel to the first preliminary operation (102), the attachment bracket (20) is attached to the component (14, 16);
- a tool free attachment sequence (106) is performed where the rotating connector (22) is clipped-on either:
  - first to the attachment stud (24), in a first sequence step (106*a*), and then, in a second sequence step (106*b*), the attachment bracket (20) is clipped-on to the rotating connector (22); or,
  - first to the attachment bracket (20) in a first sequence step (106*a*), and then, in a second sequence step (106*b*), the rotating connector (22) is clipped-on to the attachment stud (24).

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A rotating connector, comprising:

a first interface portion for a rotating tool-free mechanical clip-on connection to an attachment stud, whereby the rotating connector is rotative with respect to the attachment stud and to a support structure, the first interface portion comprising a rotary hub interface having a main axis and extending axially along the main axis in a first axial direction to a first axial extremity and in a second axial direction opposite the first axial direction to a second axial extremity; and a second interface portion comprising:

a tool-free mechanical clip-on connection configured to mechanically connect to a device, the second interface portion located at the second axial extremity of the rotary hub interface;

an axial abutment surface turned outwards in the second axial direction;

at least one hook portion which extends axially in the second axial direction with respect to the axial abutment surface for hooking onto the device, the at least one hook portion comprising a retaining wall which is perpendicular to the main axis, which is spaced from the axial abutment surface, and which is connected axially to the axial abutment surface by an outer circumferential wall and by a radial abutment wall; and a bayonet interface comprising the at least one hook portion.

2. The rotating connector of claim 1, wherein the at least one hook portion comprises a stem portion which extends in the second axial direction away from the axial abutment surface and comprises, at a free end of the stem portion, a hooking surface turned in the first axial direction, and wherein the stem portion of the at least one hook portion is elastically deformable along a transverse direction perpendicular to the main axis.

3. The rotating connector of claim 1, wherein the bayonet interface comprises an elastic lock for locking, around the main axis, an angular position of the device with respect to the rotating connector.

4. The rotating connector of claim 3, wherein the second interface portion comprises an axial abutment surface turned outwards in the second axial direction, and wherein the second interface portion comprises at least one hook portion which extends axially in the second axial direction with respect to the axial abutment surface for hooking onto the device.

5. A rotating connector, comprising:

a first interface portion for a rotating tool-free mechanical clip-on connection to an attachment stud, whereby the rotating connector is rotative with respect to the attachment stud and to a support structure, the first interface portion comprising a rotary hub interface having a main axis and extending axially along the main axis in a first axial direction to a first axial extremity and in a second axial direction opposite the first axial direction to a second axial extremity; and a second interface portion comprising a tool-free mechanical clip-on connection configured to mechanically connect to a device, the second interface portion located at the second axial extremity of the rotary hub interface;

wherein the rotary hub interface comprises a rotation wall portion which is rotationally symmetrical around the main axis and which extends axially from the first axial extremity to the second axial extremity of the rotary hub interface, and wherein the rotation wall portion delimits an interior cavity which is axially open in the first axial direction at the first axial extremity.

6. The rotating connector of claim 5, wherein the rotation wall portion comprises at least one elastic prong which has a first axial end on the side of the first axial extremity of the rotary hub interface and a second axial end on the side of the second axial extremity of the rotary hub interface, and wherein the at least one elastic prong is attached to the rotation wall portion at its first end while its second end is detached from the rotation wall portion and is biased radially inwards with respect to the rotation wall portion.

7. The rotating connector of claim 6, wherein the second interface portion is a bayonet interface and wherein the bayonet interface comprises an elastic lock for locking, around the main axis, an angular position of the device with respect to the rotating connector.

8. A connecting system for mechanically attaching a device to a support structure, wherein the connecting system comprises;

an attachment stud;

a rotating connector comprising:

a first interface portion for a rotating tool-free mechanical clip-on connection to the attachment stud, whereby the rotating connector is rotative with respect to the attachment stud and to a support structure, the first interface portion comprising a rotary hub interface having a main axis and extending axially along the main axis in a first axial direction to a first axial extremity and in a second axial direction opposite the first axial direction to a second axial extremity; and a second interface portion comprising:

a tool-free mechanical clip-on connection configured to mechanically connect to a device, the second interface portion located at the second axial extremity of the rotary hub interface;

wherein the rotary hub interface comprises a rotation wall portion which is rotationally symmetrical around the main axis and which extends axially from the first axial extremity to the second axial extremity of the rotary hub interface, and wherein the rotation wall portion delimits an interior cavity which is axially open in the first axial direction at the first axial extremity, wherein the attachment stud comprises a rotation head configured to be received in the interior cavity delimited by the rotation wall portion of the rotary hub interface of the rotating connector to secure the tool-free mechanical clip-on connection between the attachment stud and the rotating connector, and wherein the rotation head of the attachment stud is rotatable around the main axis in the interior cavity of the rotary hub interface of the rotating connector.

9. The connecting system of claim 8, wherein the second interface portion is a bayonet interface and wherein the bayonet interface comprises an elastic lock for locking, around the main axis, an angular position of the device with respect to the rotating connector.

10. An attaching arrangement for mechanically attaching a component to a support structure, wherein the attaching arrangement comprises an attachment bracket on which the component is to be attached, wherein the attaching arrangement comprises a connecting system for connecting the attachment bracket to the support structure, wherein the connecting system comprises:

an attachment stud;

a rotating connector comprising:

a first interface portion for a rotating tool-free mechanical clip-on connection to the attachment stud, whereby the rotating connector is rotative with respect to the attachment stud and to a support structure, the first interface portion comprising a rotary hub interface having a main axis and extending axially along the main axis in a first axial direction to a first axial extremity and in a second axial direction opposite the first axial direction to a second axial extremity; and a second interface portion comprising:

a tool-free mechanical clip-on connection configured to mechanically connect to a device, the second interface portion located at the second axial extremity of the rotary hub interface; and wherein the attachment bracket forms the device which is tool-free mechanically connected to the second interface portion of the rotating connector;

wherein the attachment bracket comprises a flat connecting wall having, on one side, an abutment surface configured to abut the axial abutment surface of the rotating connector, and, on the other side, a hook engagement surface configured to mate with a hook portion of the rotating connector, and wherein the flat connecting wall of the attachment bracket has an aperture through which the hook portion can be inserted axially along the main axis.

11. The attaching arrangement of claim 10, wherein the second interface portion is a bayonet interface and wherein the bayonet interface comprises an elastic lock for locking, around the main axis, an angular position of the device with respect to the rotating connector.

12. A vehicle comprising the support structure, the component, and the attaching arrangement of claim 10 for mechanically attaching the component to the support structure.

13. The vehicle of claim 12, wherein the second interface portion is a bayonet interface and wherein the bayonet interface comprises an elastic lock for locking, around the main axis, an angular position of the device with respect to the rotating connector.

14. A method for mechanically attaching a component to a support structure of a vehicle with the attaching arrangement of claim 11, wherein:

in a first preliminary operation, the attachment stud is secured to the support structure;

in a second preliminary operation, which is performed before, after, or in parallel to the first preliminary operation, the attachment bracket is attached to the component; and a tool free attachment sequence is performed where the rotating connector is clipped-on either:

first to the attachment stud, in a first sequence step, and then, in a second sequence step, the attachment bracket is clipped-on to the rotating connector; or first to the attachment bracket in a first sequence step, and then, in a second sequence step, the rotating connector is clipped-on to the attachment stud.

* * * * *